(12) United States Patent
Francois et al.

(10) Patent No.: US 6,383,969 B1
(45) Date of Patent: May 7, 2002

(54) PROCESS FOR THE PREPARATION OF A CATALYTIC COMPOSITION FOR THE POLYMERIZATION OF ALPHA-OLEFINS, CATALYTIC COMPOSITION OBTAINED AND POLYMERIZATION PROCESS USING SUCH A CATALYTIC COMPOSITION

(75) Inventors: Philippe Francois, Court-Saint-Etienne; Serge Bettonville, Crisnée; Dominique Marchand, Saive, all of (BE)

(73) Assignee: Solvay Polyolefins Europe - Belgium, Brussels (BE)

( * ) Notice: Subject to any disclaimer, the term of this patent is extended or adjusted under 35 U.S.C. 154(b) by 0 days.

(21) Appl. No.: 09/469,188

(22) Filed: Dec. 21, 1999

(30) Foreign Application Priority Data

Dec. 22, 1998 (BE) ............................................ 09800921

(51) Int. Cl.⁷ ......................... B01J 31/00; B01J 37/00; C08F 4/02; C08F 4/60; C08F 4/44
(52) U.S. Cl. ..................... 502/104; 502/108; 502/109; 502/159; 526/134; 526/160; 526/903; 526/910; 526/911
(58) Field of Search ................................ 502/103, 104, 502/108, 109, 159; 526/134, 160, 903, 910, 911

(56) References Cited

U.S. PATENT DOCUMENTS

| | | | | |
|---|---|---|---|---|
| 4,548,915 A | * | 10/1985 | Goodall et al. | ............. 502/104 |
| 4,713,430 A | * | 12/1987 | Kerth et al. | ................. 502/108 |
| 5,432,242 A | * | 7/1995 | Baron | .......................... 526/68 |
| 5,556,893 A | | 9/1996 | Costa | |
| 5,625,021 A | * | 4/1997 | Parusel et al. | ............... 526/911 |
| 5,744,556 A | * | 4/1998 | Keller et al. | ................. 526/160 |
| 6,228,791 B1 | * | 5/2001 | Kataoka et al. | ............. 502/108 |

FOREIGN PATENT DOCUMENTS

| | | | |
|---|---|---|---|
| EP | 0 314 797 | 5/1989 | |
| EP | 0 598 543 | 5/1994 | |
| EP | 0 773 237 | 5/1997 | |
| EP | 0 274 109 | 7/1998 | |
| EP | 0 865 821 | 9/1998 | |
| PL | 45141 | * 10/1961 | ................. 502/104 |
| WO | 85/02851 | * 7/1985 | ................. 502/104 |
| WO | WO 97/46599 | * 12/1997 | |

* cited by examiner

Primary Examiner—Mark L. Bell
Assistant Examiner—J. Pasterczyk
(74) Attorney, Agent, or Firm—Venable; Marina V. Schneller

(57) ABSTRACT

Disclosed is for the preparation of a catalytic composition for the polymerization of alpha-olefins. The catalyst comprises a compound of a transition metal (i) of Groups 4 to 6 of the Periodic Table, containing at least one possibly substituted cyclopentadiene ligand, and an activator (ii) chosen from aluminoxanes and ionizing agents supported on a support (iii) consisting of porous particles of polyolefin(s). Preparation includes a preliminary polymerization which includes contact with an alpha-olefin, under polymerizing conditions, in a diluent whose kinematic viscosity, measured at 20° C., is from 3 to 3000 cSt (centistokes) from 3 to 3000 mm²/s, such as mineral oil which may be derived from coal tars and petroleum fractions, to form from 0.01 to 50 g of polyolefin per g of catalyst containing compounds (i), (ii) and (iii).

7 Claims, 1 Drawing Sheet

PROCESS FOR THE PREPARATION OF A CATALYTIC COMPOSITION FOR THE POLYMERIZATION OF ALPHA-OLEFINS, CATALYTIC COMPOSITION OBTAINED AND POLYMERIZATION PROCESS USING SUCH A CATALYTIC COMPOSITION

The present invention relates to a process for the preparation of a catalytic composition for the polymerization of alpha-olefins and to the catalytic composition thus obtained. It also relates to a process for the polymerization of alpha-olefins by means of such a catalytic composition and more particularly to a process for the polymerization of propylene and of ethylene.

It is known to polymerize, with high yields, alpha-olefins by means of a catalyst containing a transition metal compound containing at least one possibly substituted cyclopentadiene radical and an activator chosen from aluminoxanes and ionizing agents. However, such catalysts lead to the production of polymers of mediocre morphology and it proves to be absolutely essential to support them on porous particles. The supports most often used are inorganic supports such as, more particularly, silicas. However, these compounds, although they allow the constituents of the catalyst to be supported effectively, have the disadvantage of leading to the formation of polymers containing not insignificant amounts of inorganic compounds, generally called ash, which reduce the performance of the polymers and more particularly their processibility and the surface appearance of the products obtained. Furthermore, sometimes it is found that the productivity of the active species is very significantly reduced.

The use of a polymer support and more particularly of polyolefin supports allows these problems to be partially solved. This is because, since such a support is compatible with the final polymer, it results, in the end, in polymers whose ash content is particularly low (U.S. Pat. No. 5,556,893 - SOLVAY). However, since these supports are particularly inert with respect to active species, they allow only partial attachment of the latter. Consequently, the efficiency of the preparation reaction is decreased, which results in economically less profitable processes. Furthermore, during polymerization, free active species may be observed which lead to the formation of fine polymer particles which disturb the polymerization and make the final polymer more difficult to handle.

These various phenomena explain a lower efficiency of the catalyst preparation reaction which is economically prejudicial. Attempts have been made to remedy this problem by using supports having a particular porosity and by subjecting the catalyst thus obtained to a gas-phase prepolymerization (EP 598,543). However, the efficiency of the catalyst preparation reaction remains insufficient and it is difficult to avoid the formation of agglomerates and blocks during the gas-phase prepolymerization. Moreover, the prepolymerization reaction, which involves the formation of relatively small amounts of prepolymer on a particulate support is difficult to carry out in the gas phase.

Figure 1:
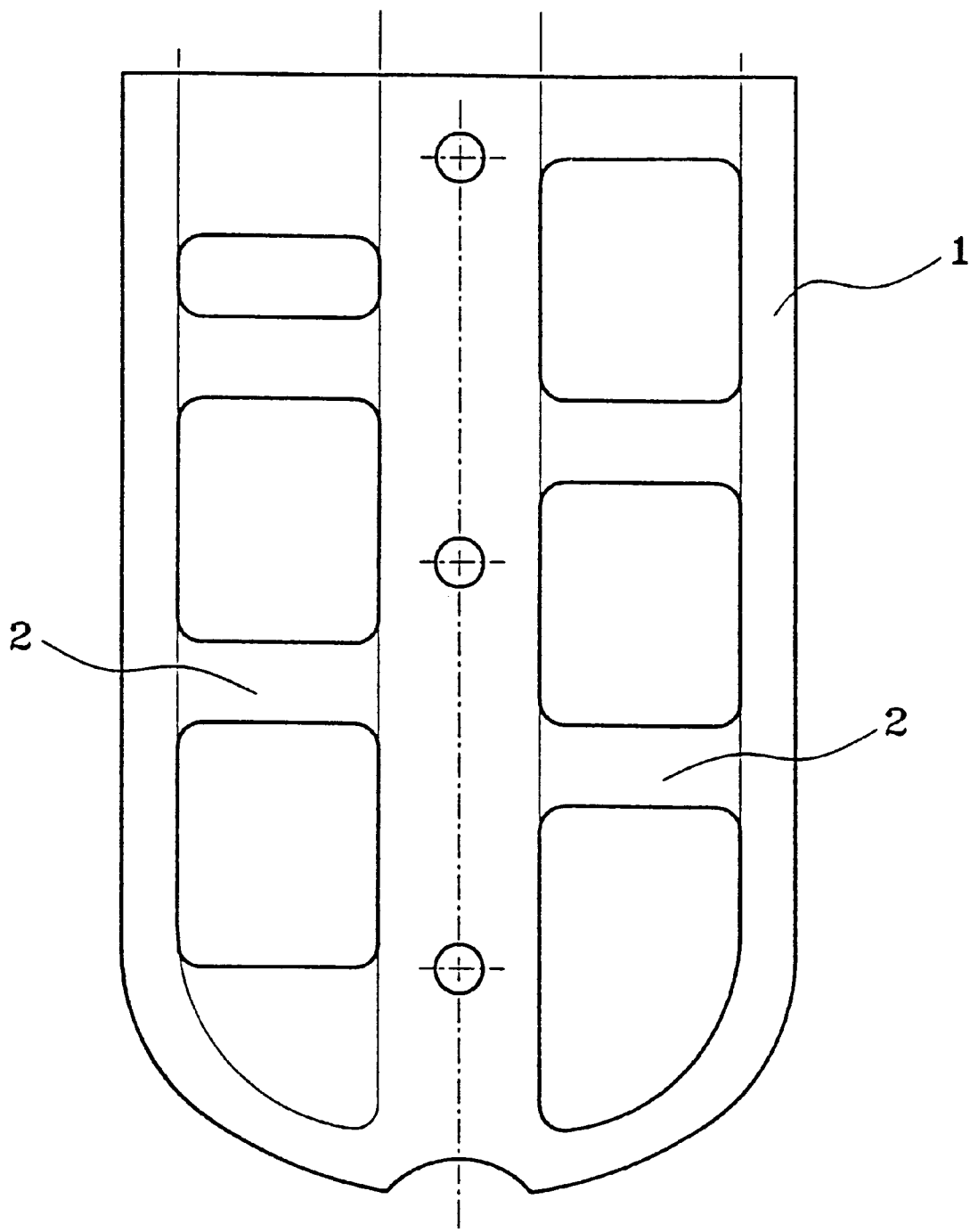
FIG. 1 presents a section view of a stirrer that can be used in the process of the invention.

A process for preparing a catalytic solid not having such disadvantages has now been discovered.

For this purpose, the present invention relates to a process for the preparation of a catalytic composition for the polymerization of alpha-olefins, in which process a catalyst comprising a compound of a transition metal (i) of Groups 4 to 6 of the Periodic Table, containing at least one possibly substituted cyclopentadiene ligand, and an activator (ii) chosen from aluminoxanes and ionizing agents supported by a support (iii) consisting of porous particles of polyolefin(s) is subjected to a preliminary polymerization during which it is brought into contact with an alpha-olefin, under polymerizing conditions, in a diluent whose kinematic viscosity, measured at 20° C., is from 3 to 3000 cSt (centistokes) (from 3 to 3000 mm$^2$/s) so as to form from 0.01 to 50 g of polyolefin per g of catalyst containing compounds (i), (ii) and (iii). The preliminary polymerization is therefore carried out in suspension in the said diluent. Preferably, the diluent employed in the preliminary polymerization step has a kinematic viscosity of at least 5 and more particularly of at least 10 cSt (mm$^2$/s). Diluents having a kinematic viscosity of at most 1000 and more particularly of at most 500 cSt (mm$^2$/s) are very suitable. The diluent is furthermore usually chosen from mineral oils. The expression "mineral oils" should be understood to mean products which have the kinematic viscosity mentioned above and which are of mineral origin. These oils may be, for example, light, medium or heavy oils coming from the distillation of coal tars or else oils obtained during the fractional distillation of petroleum. These oils are particularly preferred and, among these, oils which are hydrocarbon mixtures distilling from 225 to 400° C. approximately. Typical examples of these oils are the ONDINA® 15 to 68 oils sold by Shell or their equivalents. Particularly good results are obtained when the diluent does not dissolve compounds (i). The expression "diluent not dissolving compound (i)" should be understood to mean diluents in which, at the end of the preliminary polymerization, the maximum concentration of compound (i), under standard temperature and pressure conditions, does not exceed 100 ppm, preferably does not exceed 5 ppm.

According to the present invention, the term "alpha-olefins" should be understood to mean olefins having a terminal unsaturated group containing from 2 to 20, preferably from 2 to 8, carbon atoms such as, more particularly, ethylene, propylene, 1-butene, 1-pentene, 1-hexene and 1-octene.

The catalysts according to the present invention are obtained by supporting the transition metal compound (i) and the activator (ii) on the support (iii). It goes without saying that different constituents of compounds (i) and (ii) may be supported on the support (iii). Likewise, several compounds (i) and/or (ii) may be supported on the same support.

The transition metal compound (i) that can be used according to the present invention is usually chosen from compounds of formula

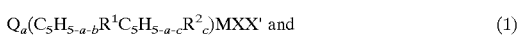  (1)

  (2)

in which:

Q represents a linking ground which ensures that the two cyclopentadiene ligands are crosslinked;

Q' represents a linking ground which ensures that the cyclopentadiene ligand and the group E are crosslinked;

a equals 0 or 1;

b, c and d are integers satisfying the conditions $0 \leq b \leq 5$, $0 \leq c \leq 5$ and $0 \leq d \leq 5$ when a equals 0 and $0 \leq b \leq 4$, $0 \leq c \leq 4$ and $0 \leq d \leq 4$ when a equals 1;

R$^1$, and R$^2$ and R$^3$ are each hydrocarbon radicals containing from 1 to 20 carbon atoms connected to the cyclopentadiene ligand, in the form of a monovalent radical, or connected to each other so as to form a ring fused to the cyclopentadiene ring, halogen atoms, alkoxy groups having from 1 to 12 carbon atoms, silicon-containing hydrocarbon groups of formula —Si(R')(R")R'"), phosphorous-containing hydrocarbon groups of formula —P(R')(R"), nitrogen-containing hydrocarbon groups of formula —N(R')(R") or boron-containing hydrocarbon groups of formula —B(R')(R") in which R', R" and R'" represent hydrocarbon groups containing from 1 to 24 carbon atoms to the extent that, when b, c or d equals 2 or more and/or there are a number of radicals R$^1$, and R$^2$ and R$^3$, the latter may be identical or different;

M is a transition metal of Groups 4 to 6 of the Periodic Table;

E is an oxygen, a sulfur, an alkoxy or thioalkoxy group having from 1 to 20 carbon atoms, a nitrogen- or phosphorus-containing hydrocarbon group containing from 1 to 40 carbon atoms or a hydrocarbon group containing from 1 to 20 carbon atoms, as long as one bond of the group E is linked to the group Q' when a equals 1; and X and X", which are identical or different, are each a hydrogen, a halogen, a hydrocarbon group having 1 to 20 carbon atoms.

Preferred compounds (i) of formula (1) are generally such that:

Q is an alkylene radical containing 1 or 2 carbon atoms, possible substituted with alkyl or aryl groups containing from 1 to 10 carbon atoms, a dialkylgermanium or a dialkylsilicon containing from 1 to 6 carbon atoms;

a equals 0 or 1;

b and c are integers satisfying the conditions $0 \leq b \leq 5$, and $0 \leq c \leq 5$ when a equals 0 and $0 \leq b \leq 4$, $0 \leq c \leq 4$ when a equals 1;

R$^1$ and R$^2$ are alkyl, alkenyl, aryl and alkylaryl, alkenylaryl or arylalkyl radicals containing from 1 to 20 carbon atoms, it being possible for several radicals R$^1$ and/or several radicals R$^2$ to be connected to each other so as to form a ring containing from 4 to 8 carbon atoms;

M is zirconium, hafnium or titanium;

X and X" are halogens or hydrocarbon groups chosen from alkyls, aryls and alkenyls containing from 1 to 10 carbon atoms.

By way of particularly preferred examples of these compounds, mention may be made of compounds of formula (1) in which Q is chosen from dimethylsilyl and diphenylsilyl and methylene and ethylene both substituted by alkyl or aryl groups containing from 1 to 8 carbon atoms. Compounds of formula (1) which are particularly well suited are compounds in which the radicals ($C_5H_{5-a-b}R^1_b$) and ($C_5H_{5-a-c}R^2_c$) are chosen from cyclopentadienyl, indenyl and fluorenyl groups, these possibly being substituted.

Preferred compounds (i) of formula (2) are usually such that:

a equals 1;

Q' is an alkylene radical containing 1 or 2 carbon atoms, possibly substituted with alkyl or aryl groups containing from 1 to 10 carbon atoms, a alkylgermanium or dialkysilicon containing from 1 to 6 carbon atoms;

R$^3$ is an alkyl, alkenyl, aryl, alkylaryl, or arylalkyl radical containing from 1 to 20 carbon atoms, it being possible for two radicals R$^3$ to be connected to each other so as to form a ring containing from 4 to 8 carbon atoms;

d is an integer in such that $0 \leq d \leq 4$;

M is zirconium, hafnium or titanium;

X and X" are halogens or hydrocarbon groups chosen from alkyls, aryls and alkenyls.

Compounds (i) of formula (2) giving good results are compounds in which the substituent ($C_5H_{5-a-d}R^3_d$) is a possibly substituted cyclopentadienyl, indenyl or fluorenyl substituent and Z is an amino group.

The activator (ii) is chosen from aluminoxanes and ionizing agents. The term "alurninoxanes" should be understood to mean compounds corresponding to the formulae $R_2AlO$—$(AlR$—$O)_n$—$AlR_2$ and $(-AlR$—$O-)_{n+2}$ in which n is a number from 1 to 40 and R is an alkyl or aryl group containing from 1 to 12 carbon atoms. The preferred compounds of this type are methyl-, ethyl- or isobutylaluminoxanes.

The expression "ionizing agents" should be understood to mean compounds comprising a first part which has the properties of a Lewis acid and which is capable of ionizing the cyclopentadiene compound, and a second part which is inert with respect to the ionized cyclopentadiene compound and is capable of stabilizing it. By way of examples of such compounds, mention may be made of triphenylcarbenium tetrakis(pentafluorophenyl)borate, N,N-dimethylanilinium tetrakis(pentafluorophenyl)borate, tri(n-butyl)ammonium tetrakis(penta-fluorophenyl)borate, tri(pentafluorophenyl) boron, triphenylboron, trimethylboron, tri(trimethylsilyl) borate and organoboroxines.

The preferred activators according to the present invention are aluminoxanes.

The support (iii) that can be used according to the present invention consists of porous particles of polyolefin(s). The expression "polyolefins" should be understood to mean polymers derived from the alpha-olefins defined above or copolymers of these alpha-olefins among themselves or with diolefins comprising from 4 to 18 carbon atoms. Polymers derived solely from alpha-olefins are very suitable. The preferred supports according to the present invention are homopolymers or copolymers of ethylene and of propylene. The polyolefin particles that can be used as support usually have a mean diameter of 5 to 500 μm. Preferably, the mean diameter is greater than or equal to 8 μm and more particularly greater than or equal to 15 μm. Particles having a mean diameter of less than or equal to 200 μm and more particularly less than or equal to 150 μm give good results.

The pore volume of the support particles is also an important characteristic, Usually, the polyolefin particles used as support have a pore volume, generated by pores having a radius of from 1000 to 75,000 Å ($10^{-10}$ m), of at least 0.2 cm$^3$/g. Pore volumes of at least 0.3 cm$^3$/g and preferably of at least 0.5 cm$^3$/g give satisfactory results.

The supports (iii) preferably used according to the present invention are described in Patent U.S. Pat. No. 5,556,893, the contents of which are incorporated by reference in the present description. These preferred supports are obtained by the polymerization of one or more alpha-olefins by means of a solid based on a particular titanium trichloride prepared using a process which comprises bringing titanium tetrachloride (TiCl$_4$), pretreated with an electron-donating compound, into contact with an organoaluminium composition corresponding to the general formula

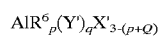

in which:

R$^6$ represents a hydrocarbon radical preferably chosen from linear or branched alkyl radicals containing from 2 to 8 carbon atoms;

Y' represents a group chosen from —OR$^4$, —SR$^4$ and —NR$^4$R$^5$ in which R$^4$ and R$^5$ each represent a hydrocarbon radical containing from 1 to 35 carbon atoms or a hydrogen atom;

X' represents a halogen;

p is any number such that 0<p<2.5;

q is any number such that 0.5<q<3, the sum (p+q) being such that 0.5<(p+q) <3 so as to obtain a liquid material which is, then subjected to a heat treatment carried out in the presence of a halogenated agent.

The polymerization reaction is generally carried out under conditions such that from 5 to 3000 g, preferably from 15 to 500 g, of polymer per g of catalytic compound based on titanium trichloride are formed.

Such supports have the advantage of having the desired morphology without having to undergo subsequent treatment(s). They are particularly inexpensive and have, at the same time, a very high porosity and a very high abrasion resistance, allowing them to be used in reactors fitted with the stirrers defined above. Subjected to the same conditions, the supports of the prior art and more particularly the silica supports do not retain their morphology.

The respective amounts of compounds (i), (ii) and (iii) in the catalyst are not critical. Usually, the catalyst contains from 0.0001 to 0.5 g of compound (i) per gramme of support (iii). Preferably, the concentration of compound (i) is at least 0.0005 and more particularly at least 0.001 g per gramme of support (iii). Amounts of compound (i) of less than or equal to 0.3 and preferably less than or equal to 0.1 g per gramme of support give good results.

The amount of activator compound (ii) depends on the type of activator used. When the activator (ii) is an aluminoxane, the amount of activator (ii) is usually such that the atomic ratio of aluminium of the aluminoxane to the metal of compound (i) is from 20 to 5000. Preferably, this ratio is at least 50, more particularly at least 100. Good results are obtained when this ratio is at least 200. Usually, the activator (ii) is used in amounts such that the aluminium/metal atomic ratio is at most 2000 and more particularly at most 1500. Ratios of at most 1000 give good results. When the activator (ii) is an ionizing agent, the transition metal compound (i) is usually present in amounts such that the molar ratio of the activator (ii) to compound (i) is from 0.05 to 50. Preferably, this ratio is at least 0.1 and more particularly at most 20. Ratios of at most 10 give particularly good results.

The alpha-olefin employed in the preliminary polymerization step is advantageously chosen from alpha-olefins containing from 2 to 4 carbon atoms. Ethylene and propylene are particularly suitable. The amount of polymer formed during the preliminary polymerization step is usually at least 0.05 and more particularly at least 0.1 g of polyolefin per g of catalyst containing compounds (i), (ii) and (iii). Good results are obtained when this amount is less than or equal to 30 g, preferably at most 10 g per g of catalyst containing compounds (i), (ii) and (iii).

In this preliminary polymerization step, the polymerization is carried out in suspension in the abovementioned diluent, the monomer usually being employed at a partial pressure of from approximately 0.1 to approximately 10 kg/cm$^2$. This partial pressure is then kept constant by introducing monomer until the desired amount of monomer has been polymerized. Preferably, the monomer partial pressure is greater than or equal to approximately 0.2 kg/cm$^2$ and more particularly greater than or equal to approximately 0.5 kg/cm$^2$. Usually this partial pressure is less than or equal to 5 kg/cm$^2$ and more particularly less than or equal to 3 kg/cm$^2$. The duration of the preliminary polymerization may vary from approximately 1 minute to approximately 15 hours, durations ranging from approximately 5 minutes to approximately 5 hours being more commonly used. The temperature of the preliminary polymerization usually ranges from approximately 0 to approximately 100° C., more particularly from approximately 10 to approximately 85° C. It may also prove to be advantageous during the preliminary polymerization to introduce a known agent for controlling the molecular mass of the polymers, such as, for example, hydrogen. In certain cases too, more than one alpha-olefin are employed. However, it is preferred to employ only one alpha-olefin in the preliminary polymerization.

The catalyst employed in the preliminary polymerization step may be prepared by any process known per se. By way of example of such processes, mention may be made of a process in which compounds (i) and (ii) are dissolved in a solvent which is then evaporated in the presence of the support (iii) or in which compounds (i) and (ii) are dissolved in a solvent so as to obtain a solution close to saturation, to which solution the support particles (iii) are added in an amount such that all of the solution can be supported.

According to one particularly preferred process, the support particles are brought into contact with a solution containing the activator (ii) in order to obtain a suspension, which is then evaporated in a reactor fitted with a stirrer comprising a scraping element which follows the walls of the reactor in such a way that the distance between the edges of this element which are closest to the walls of the reactor and the said walls is from 2 to 200 times the mean diameter of the support particles. This distance is preferably at least 4 times, and more particularly at least 10 times, the mean diameter of the support particles. A distance of at most 100 times and preferably of at most 50 times the mean particle diameter gives good results. A distance of at most 30 times the mean particle diameter is very suitable.

In this process, it is preferable that, when the stirrer is moving, the edges of the scraping element closest to the walls of the reactor follow more than 50%, preferably more than 60% and even more particularly more than 70% of the surface of the reactor in contact with the suspension. The use of such a stirrer during the evaporation of the solvent prevents the particles form crusting on the walls of the reactor. Since such crusting is mainly observed when the activator (ii) is an aluminoxane compound, the use of the stirrer described above is particularly favorable when the activator (ii) is chosen from these compounds. The geometry of the scraping element is not critical as long as it satisfies the conditions described above. However, it is preferred for the scraping element to have the shape of an anchor following the walls of the reactor. It is also favourable for the stirrer to comprise one or more elements ensuring that the suspension during evaporation is effectively homogenized. Such elements favourably consist of plates fastened to the shaft of the stirrer. In certain cases, and more particularly when the amount of suspension to be evaporated is large, these plates may make an angle of generally between 25 and 155° with the axis of the stirrer.

In this process, the speed of rotation of the stirrer is not critical. However, it is preferred for it to be greater than or equal to 5 and preferably greater than or equal to 10 rpm. Rates of stirring of less than or equal to 400 and preferably at most 250 rpm are very suitable.

The solution containing the activator (ii) is generally prepared from liquid, aliphatic or cycloaliphatic hydrocarbons, these possibly being halogenated, or from liquid aromatic hydrocarbons. By way of preferred examples of these solvents, mention may be made of benzene, toluene, xylene, hexane, heptane, octane, decalin, dichloromethane, dichloroethene, chloropropane and chlorobenzene. The concentration of the activator (ii) in the solution is not generally critical. Usually, the activator (ii) is present at a concentration of 0.1 to 60% by weight with respect to the total weight of solvent. Preferably, the minimum concentration of activator is at least 1% and more particularly at least 3% by weight with respect to the total weight of solvent. This concentration is furthermore usually less than or equal to 50% by weight with respect to the weight of solvent. Concentrations of less than or equal to 30% by weight give particularly good results. The amount of support employed in this step depends on the amount of activator (ii) that it is desired to deposit on the support and depends on the porosity of the said support. Usually, the amount of support is from 0.5 to 60% by weight with respect to the weight of solvent. Preferably, this amount is at least 2% by weight and more particularly at least 5% by weight with respect to the weight of solvent. An amount not exceeding 50% by weight and more particularly not exceeding 30% by weight with respect to the weight of solvent is very suitable.

The solvent may be evaporated using any of the methods known for this purpose, such as, for example, evaporation under reduced pressure, entrainment with a gas, evaporation under the action of heat or else a combination of these various means. The pressure, temperature and duration conditions depend on the process used. The solvent is usually evaporated until its concentration in the catalyst is less than or equal to 2% by weight, preferably less than or equal to 1% by weight, with respect to the weight of support.

The transition metal compound (i) may be introduced into the suspension described above. It may also be incorporated into the support before its use. Finally, it may be brought into contact with the support particles comprising the activator (ii). The process that gives the best results comprises the preparation of a solution containing the transition metal compound (i) and the activator (ii) to which the support (iii) is added so as to form a suspension which is then evaporated.

The compound (i) is generally employed in an amount such that the respective amounts of compounds (i) and (ii) and (iii) described above are satisfied.

The efficiency of this catalyst preparation process is particularly high. It is found in fact that this process makes it possible to obtain a dry powder of good flowability with an efficiency of at least 90% and more particularly at least 95% of the compounds employed. Furthermore, it is found that more than 90%, usually more than 95% and even more particularly more that 98% of compound (i) employed are incorporated in the support (iii). It is also found, surprisingly, that more than 85% by weight, generally more than 90% by weight and more particularly more than 95% by weight of activator (ii) employed are incorporated into the support (iii).

The catalyst particles have the same morphology as the supports which have given rise to them.

One particular process of preparation according to the present invention comprises bringing the support (iii) into contact with a solution containing the transition metal compound (i) and the activator (ii) so as to obtain a suspension which is then evaporated in a reactor fitted with a stirrer comprising a scraping element which follows the walls of the reactor in such a way that the distance between the edges of this element which are closest to the walls of the reactor and the said walls is from 4 to 50 times the mean diameter of the support particles, the said stirrer also comprising an element which ensures that the suspension is homogenized in order to obtain a pulverulent solid which is then subjected to a preliminary polymerization during which it is brought into contact with an alpha-olefin containing from 2 to 4 carbon atoms in a mineral oil having a kinematic viscosity of 20 to 300 cSt (mm$^2$/s) in order to form from 0.1 to 20 g of polyolefin per g of catalyst containing compounds (i), (ii) and (iii).

The catalytic compositions thus obtained, which also form the subject of the present invention, are advantageously used for the polymerization of alpha-olefins as they are (that is to say in the form of the suspension that has undergone the preliminary polymerization) or after partial or complete removal of the diluent. They may also be employed after having been washed with an inert hydrocarbon diluent preferably chosen from aliphatic, cycloaliphatic and aromatic liquid hydrocarbons such as liquid alkanes, isoalkanes and cycloalkanes, benzene and toluene.

They have the advantage of having a particularly high activity. In fact, it is observed, surprisingly, that these catalytic compositions have an activity very close and even often equal to that obtained by not supporting compounds (i) and (ii). Moreover, the use of these catalytic compositions allows polymers to be obtained which have a very good morphology and the amount of fine particles (particles having a diameter of less than or equal to 100 $\mu$m) in which is very low, usually less than 0.5% by weight and more particularly less than 0.1% by weight with respect to the total weight of polymer. Such a low fines content is obtained even when the efficiency of the polymerization reaction leads to a polymer containing less than 0.2 ppm of transition metal.

Finally, the present invention relates to a process for the homopolymerization and/or copolymerization of alpha-olefins, in which one or more alpha-olefins are brought into contact, under polymerizing conditions, with the catalytic composition described above. The polymerization process according to the invention may or may not be carried out continuously, according to any known process, in solution or in suspension in a hydrocarbon diluent, in suspension in the or one of the monomers maintained in the liquid state, or else in the gas phase. The polymerization temperature usually ranges from $-20°$ C. to $+150°$ C. The pressure is preferably chosen between atmospheric pressure and $100 \times 10^5$ Pa, more particularly between 10 and $55 \times 10^5$ Pa. The molecular mass of the polymers manufactured according to the process of the invention may be controlled by the addition of one or more agents for controlling the molecular mass of the polyolefins, such as, more particularly, hydrogen.

Moreover, it may also prove to be preferable to introduce one or more organoaluminium compounds into the polymerization mixture, making it possible to improve the activity of the catalytic composition and/or to capture the poisons of the polymerization reactions. These compounds may be aluminoxanes as described above or organoaluminium compounds corresponding to the formula $R_m AlX'_{3-m}$ or $R_m AlOR^7_{3-m}$, in which R and X' are radicals as defined above, $R^7$ is a hydrocarbon radical containing from 1 to 20 carbon atoms and m is a number such that $0 \leq m \leq 3$. Preferred organoaluminium compounds are trialkylaluminiums, alkylaluminium halides and aluminoxanes.

One particularly advantageous polymerization process relates to the homopolymerization and copolymerization of ethylene and propylene.

When the propylene polymerization is carried out in suspension in the liquid monomer or in the gas phase, it proves to be advantageous to carry out a first polymerization step, separate from the preliminary polymerization and called hereafter the prepolymerization step, in the liquid monomer at a temperature ranging from 0 to 60° C., during which from 10 to 1000 g of polymer per g of catalytic solid containing compounds (i), (ii) and (iii) are formed.

Such a prepolymerization step is also advantageous when ethylene is polymerized in a hydrocarbon diluent chosen from aliphatic hydrocarbons containing from 3 to 10 carbon atoms or in the gas phase. In this case, the prepolymerization is carried out in a diluent chosen from aliphatic hydrocarbons containing from 3 to 10 carbon atoms, at a temperature ranging from 0 to 60° C., and the amount of prepolymer is from 10 to 1000 g of polymer per g of catalytic solid containing compounds (i), (ii) and (iii).

The amount of prepolymer formed in these steps is usually at least 20 and more particularly at least 50 g per g of catalytic solid containing compounds (i), (ii) and (iii). Good results are obtained when the amount of prepolymer is at most 700 and more particularly at most 400 g per g of catalytic solid containing compounds (i), (ii) and (iii). Preferably these steps are carried out at a temperature ranging from 20 to 50° C.

One advantage of the processes comprising such a step is that the morphology of the polymer is preserved, even when the polymerization is carried out at high temperature.

The following examples serve to illustrate the invention. The meaning of the symbols used in these examples, the units expressing the quantities mentioned and the methods for measuring these quantities are explained below.

FIG. 1 shows an example of a stirrer that can be used in the process according to the invention. This stirrer comprises a scraping element 1, in the form of an anchor. The distance between the edges of this stirrer which are closest to the walls of the reactor and the said walls is 1 mm.

During rotation of the stirrer, the edges of this element follow more than 95% of the surface of the reactor in contact with the suspension. The stirrer is also fitted with blades 2, ensuring that the suspension is homogenized. These blades are arranged vertically and are connected to the scraping element.

The porosity of the supports (iii) is determined by the mercury penetration method by means of porosimeters sold by Carlo Erba Co. in the region of pore radii ranging from 75 to 75,000 Å ($10^{-10}$ m). The curve of the pore volume expressed in cm$^3$/g as a function of the pore diameter is thus obtained, from which the pore volume generated by the pores having radii ranging from 1000 to 75,000 Å ($10^{-10}$ m) is determined.

The mean diameter of the support particles is the median particle diameter measured using a suspension in 2-propanol according to the NF X11-666 (1984) standard on a MALVERN® apparatus, model Mastersizer MS 1000.

Ds=mean diameter of the support particles in $\mu$m.

VPs=internal pore volume of the support, generated by the pores having radii ranging from 1000 to 75,000 Å ($10^{-10}$ m) expressed in cm$^3$/g.

α=catalytic activity conventionally expressed in kg of polymer insoluble in the polymerization mixture, obtained per millimole of metal contained in compound (i). This activity is obtained indirectly from the determination of the residual metal content in the polymer by Inductively Coupled Plasma Mass Spectrometry (ICP-MS) on a MICROMASS® Plasma Trace 1 apparatus.

Prod=amount of polymer formed during the polymerization trials, expressed in g of polymer per g of catalytic compound employed (catalyst or catalytic composition).

BD=bulk density of the insoluble polymer fraction expressed in g/dm$^3$.

FTri =isotacticity index of the propylene polymer, obtained from the molar fraction of isotactic triads (a linked sequence of three monomeric propylene units in meso configuration) in the total polymer. This value is determined by $^{13}$C nuclear magnetic resonance as described in Macromolecules, Vol. 6, No. 6, page 925 (1973).

MFI=melt flow index measured under a load of 2.16 kg 230° C. and expressed in g/10 minutes (ASTM D 1238 (1986) standard).

MI=melt flow index measured under a load of 2.16 kg at 190° C. and expressed in g/10 minutes (ASTM D 1238 (1986) standard).

HLMI=melt flow index measured under a load of 21.6 kg at 190° C. and expressed in g/10 minutes (ASTM D 1238 (1986) standard).

HLMI/MI=a measurement of the distribution of molecular weights of the polymers.

EXAMPLE 1 (Control)

A. Preparation of the Catalyst

Introduced successively into a preconditioned 0.8 1 reactor, fitted with a stirrer as described above in relation to FIG. 1, are 1.12 g of dimethylsilyl-1,1-bis(2-methyl-4,5-benzoindenyl) ZrCl$_2$ [compound (i)] and 50 ml of toluene. Next, 500 ml of a solution of methylaluminoxane [compound (ii)] containing 10% by weight of the latter in toluene and 50 g of a propylene support [compound (iii)] prepared as described in Example 1 of Patent U.S. Pat. No. 5,556,893 and characterized by a Ds of 100 and a VPs of 0.93 are added, drop by drop and with stirring. The distance between the edges of the stirrer which are closest to the walls of the reactor and the said walls is therefore 1 o times the mean diameter of the support particles.

The suspension thus obtained is then heated to 65° C. and evaporated with stirring and in a stream of nitrogen until a dry powder of good flowability is obtained. This evaporation step lasts approximately 10 hours and is regarded as being complete when the solvent concentration in the nitrogen at the outlet of the reactor is less than 50 ppm. For the purposes of analysis, 4.4 g of powder are removed at ambient temperature. The zirconium content of this powder, measured by X-ray fluorescence, is 2.3 g/kg.

The rest of the powder is then suspended, under a nitrogen stream, in 518.8 g of an ONDINA®32 mineral oil sold by Shell and having a kinematic viscosity of 90 cSt, so as to form a 15% by weight suspension. Thus, 598 g of suspension containing neither blocks nor agglomerates and corresponding to 98% of the compounds employed is recovered. The walls of the reactor show no traces of crusting.

B. Propylene Polymerization

Introduced into a predried 5 liter autoclave, under a stream of dry nitrogen, are 2 mmol of triethylaluminium and 3 liters of liquid propylene.

After having introduced 1 ml of catalyst suspension, the reactor is maintained at 30° C. for 20 minutes (prepolymerization) and then a hydrogen partial pressure of approximately 0.15 bar is introduced before the temperature of the reactor is increased to 60° C. After 1 hour, the excess propylene is vented and propylene, in the form of particles having a uniform morphology, the BD of which is 362, and containing neither particles having a diameter of less than or equal to 1000 μm nor particles having a diameter of less than or equal to 100 μm is recovered with a Prod of 1770. The walls of the reactor show no traces of crusting.

EXAMPLE 2 (According to the Invention)

A. Preparation of the Catalytic Composition

Introduced into the reactor described in Example 1 are 226 g of the suspension obtained in Example 1. With the container being maintained at 25° C., under an inert atmosphere, propylene is then introduced therein under a partial pressure of 1.5 kg/cm². This introduction is maintained for approximately 35 minutes so as to incorporate 13.5 ml of propylene (preliminary polymerization—0.2 g of polypropylene per gramme of catalyst containing compounds (i), (ii) and B. Propylene Polymerization Subjected to a polymerization test identical to that of Example 1, this catalytic composition allows the formation, with a Prod of 2080, of polypropylene in the form of particles of uniform morphology (BD of 388 and no particle diameter ≦1000 μm). The walls of the reactor show no traces of crusting. It may therefore be seen that the preliminary polymerization of the catalyst makes it possible to improve both the morphology of the polymer and the productivity of the polymerization reaction.

EXAMPLE 3 (According to the Invention)

A. Preparation of the Catalytic Composition

Introduced successively into the reactor as described in Example 1 are 0.438 g of dimethylsilyl-1,1-bis(2-methyl-4,5-benzoindenyl) ZrCl₂ [compound (i)] and 50 ml of toluene. Next, 150 ml of a solution of methylaluminoxane containing 10% by weight of the latter in toluene and 40 g of the support of Example 1 are added drop by drop and with stirring.

The suspension thus obtained is then heated to 65° C. and evaporated with stirring and in a stream of nitrogen until a dry powder of good flowability is obtained. This evaporation step lasts approximately 5 hours and is regarded as being complete when the solvent concentration in the nitrogen at the outlet of the reactor is less than 50 ppm. The powder is then suspended under a nitrogen stream, in 577 g of ONDINA 32 mineral oil so as to form an 8% by weight suspension. With the container being maintained at 25° C., under an inert atmosphere, propylene with a partial pressure of 1.5 kg/cm² is then introduced. This introduction is maintained for approximately 60 minutes so as to incorporate 25 ml of propylene (preliminary polymerization—0.2 g of polypropylene per gramme of catalyst containing compounds (i), (ii) and (iii)).

B. Propylene Polymerization

The catalytic composition obtained in section A is subjected to a polymerization test identical to that of Example 1, except that the amount of suspension of catalytic composition is 1.5 ml and the reactor temperature is 70° C. The polypropylene formed is in the form of particles of uniform morphology (BD of 356 and no particles having a diameter of ≦1000 μm). The Prod is 3790 and the very high activity (α=456) is similar to that described in the literature for a "homogeneous" polymerization under similar conditions. The walls of the reactor show no traces of crusting.

What is claimed is:

1. A process for the preparation of a catalyst composition for the polymerization of alpha-olefins, in which process a catalyst comprising a compound of a transition metal (i) of Groups 4 to 6 of the Periodic Table, containing at least one optionally substituted cyclopentadiene ligand, and an activator (ii) selected from the group consisting of aluminoxanes and ionizing agents supported by a support (iii) consisting of porous particles of polyolefin(s) is subjected to a preliminary polymerization during which it is brought into contact with an alpha-olefin, under polymerizing conditions, in a diluent whose kinematic viscosity, measures at 20° C., is from 3 to 3000 cSt (centistokes) (from 3 to 3000 mm²/s) so as to form from 0.01 to 50 g of polyolefin per g of catalyst containing compounds (i), (ii) and (iii).

2. The process according to claim 1 in which the transition metal compound (i) is selected from the group consisting of compounds of formula

$$Q_a(C_5H_{5-a-b}R^1_b)(C_5H_{5-a-c}R^2_c)MXX'' \text{ and} \quad (1)$$

$$Q'_a(C_5H_{5-a-d}R^3_d)EMXX'' \quad (2)$$

in which:

Q represents a linking group which ensures that the two cyclopentadiene ligands are crosslinked;

Q' represents a linking group which ensures that the cyclopentadiene and the group E are crosslinked, a equals 0 or 1;

b, c and d are integers satisfying the conditions 0≦b≦5, 0≦c≦5 and 0≦d≦5 when a equals 0 and 0≦b≦4, 0≦c≦4 and 0≦d≦4 when a equals 1;

R¹, R² and R³ are each hydrocarbon radicals containing from 1 to 20 carbon atoms optionally connected to the cyclopentadiene ligand, in the form of a monovalent radical, or optionally connected to each other so as to form a ring fused to their cyclopentadiene rings, halogen atoms, alkoxy groups having from 1 to 12 carbon atoms, silicon-containing hydrocarbon groups of formula —Si(R')(R'')(R'''), phosphorous containing hydrocarbon groups of formula —P(R')(R''), nitrogen-containing hydrocarbon groups of formula —N(R')(R'') or boron-containing hydrocarbon groups of formula —B(R')(R'') in which R', R'' and R''' represent hydrocarbon groups containing from 1 to 24 carbon atoms and, when b, c or d equals 2 or more, then each of R¹, R², or R³ are identical or different;

M is a transition metal of Groups 4 to 6 of the Periodic table; E is an oxygen, a sulphur, an alkoxy or thioalkoxy group having from 1 to 20 carbon atoms, a nitrogen- or phosphorous-containing hydrocarbon group having from 1 to 40 carbon atoms or a hydrocarbon group containing from 1 to 20 carbon atoms, as long as one bond of the group E is linked to the group Q' when a equals 1; and X and X'', which are identical or different, are each a hydrogen, a halogen, a hydrocarbon group, an alkoxy group, an amino group, a phosphorus-containing hydrocarbon group or a silicon-containing hydrocarbon group having from 1 to 20 carbon atoms.

3. The process according to claim 1 in which the support (iii) is obtained by the polymerization of one or more alpha-olefins in the presence of a solid comprising a titanium trichloride prepared by a process which comprises contacting an electron-donating compound pretreated titanium tetrachloride (TiCl$_4$), with an organoaluminium composition corresponding to the general formula

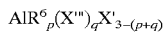

in which:

R$^6$ represents a hydrocarbon radical selected from the group consisting of linear and branched alkyl radicals containing from 2 to 8 carbon atoms;

X''' is selected from the group consisting of —OR$^4$, —SR$^4$ and —NR$^4$R$^5$ in which R$^4$ and R$^5$ each represent a hydrocarbon radical containing from 1 to 35 carbon atoms or a hydrogen atom;

X' represents a halogen;

p is any number such that 0<p≦2.5;

q is any number such that 0.5<q<3, the sum (p+q) being such that 0.5<(p+q)≦3 so as to obtain a liquid material, which is then subjected to a heat treatment carried out in the presence of a halogenated agent.

4. The process according to claim 1 which comprises bringing the support (iii) into contact with a solution containing the transition metal compound (i) and the activator (ii) so as to obtain a suspension which is then evaporated in a reactor fitted with a stirrer comprising a scraping element which follows the walls of the reactor in such a way that the distance between the edges of this element which are closest to the walls of the reactor and the said walls is from 4 to 50 times the means diameter of the support particles, the said stirrer also comprising an element which ensures that the suspension is homogenized in order to obtain a pulverulent solid which is then subjected to preliminary polymerization during which it is brought into contact with an alpha-olefin containing from 2 to 4 carbon atoms in a mineral oil having a kinematic viscosity of 20 to 300 cSt (mm$^2$/s) in order to form from 0.1 to 20 g of polyolefin per g of catalyst containing compounds (i), (ii) and (iii).

5. A process for the homopolymerization or copolymerization of alpha-olefins comprising containing an alpha-olefin under olefin polymerization conditions with the catalyst composition prepared according to claim 1.

6. The process according to claim 5 comprising the polymerization of propylene in suspension in liquid propylene monomer or in the gas phase, comprising a step of prepolymerization in the liquid propylene monomer at a temperature ranging from 0 to 60° C. during which from 10 to 1000 g of polymer per g of catalyst solid containing components (i), (ii) and (iii) are formed.

7. The process according to claim 5 comprising the polymerization of ethylene in a hydrocarbon diluent of aliphatic hydrocarbons containing from 3 to 10 carbon atoms or in the gas phase, comprising a step of prepolymerization in said hydrocarbon diluent at a temperature ranging from 0 to 60° C. so as to form from 10 to 1000 g of polymer per gramme of catalyst solid containing components (i), and (iii).

* * * * *